United States Patent [19]

Kaun

[11] 4,358,513
[45] Nov. 9, 1982

[54] ELECTROCHEMICAL CELL AND NEGATIVE ELECTRODE THEREFOR

[75] Inventor: Thomas D. Kaun, New Lenox, Ill.

[73] Assignee: The United States of America as represented by the United States Department of Energy, Washington, D.C.

[21] Appl. No.: 287,857

[22] Filed: Jul. 29, 1981

[51] Int. Cl.³ .............................................. H01M 4/36
[52] U.S. Cl. .................................... 429/103; 429/218; 252/182.1; 252/502; 252/513
[58] Field of Search ....................... 429/103, 218, 221; 252/182.1, 513, 502

[56] References Cited

U.S. PATENT DOCUMENTS

| | | | |
|---|---|---|---|
| 3,607,413 | 9/1971 | Buzzelli | 136/76 |
| 3,957,532 | 5/1976 | Settle et al. | 136/75 |
| 4,011,372 | 3/1977 | Tomczuk et al. | 429/218 |
| 4,158,720 | 6/1979 | Kaun | 428/567 |
| 4,304,825 | 12/1981 | Basu | 429/103 |

Primary Examiner—Charles F. LeFevour

[57] ABSTRACT

A secondary electrochemical cell with the positive and negative electrodes separated by a molten salt electrolyte with the negative electrode comprising a particulate mixture of lithium-aluminum alloy and electrolyte and an additive selected from graphitized carbon, Raney iron or mixtures thereof. The lithium-aluminum alloy is present in the range of from about 45 to about 80 percent by volume of the negative electrode, and the electrolyte is present in an amount not less than about 10 percent by volume of the negative electrode. The additive of graphitized carbon is present in the range of from about 1 to about 10 percent by volume of the negative electrode, and the Raney iron additive is present in the range of from about 3 to about 10 percent by volume of the negative electrode.

20 Claims, 3 Drawing Figures

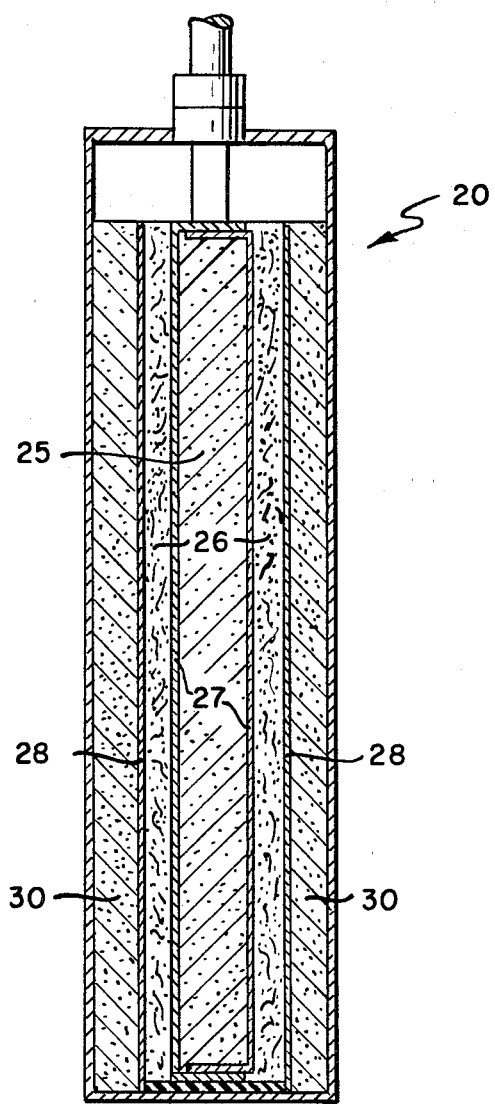

ELECTROCHEMICAL CELL AND NEGATIVE ELECTRODE THEREFOR

CONTRACTUAL ORIGIN OF THE INVENTION

The invention described herein was made in the course, of, or under, a contract with the UNITED STATES DEPARTMENT OF ENERGY.

BACKGROUND OF THE INVENTION

The present invention relates to electrodes for use in secondary electrochemical cells. More particularly, it concerns a negative electrode composition and cell including a lithium-aluminum alloy and an additive which exhibits an increased capacity and lithium-aluminum alloy utilization over that of a lithium-aluminum electrode without the additive.

A substantial amount of work has been done in the development of high-temperature, secondary electrochemical cells. Positive electrodes for these cells have included chalcogens such as sulfur, oxygen, selenium or tellurium as well as their transition metal chalcogenides. Positive electrode materials such as the sulfides of iron, cobalt, nickel and copper are of current interest.

In high-temperature cells, current flow between electrodes often is transmitted by molten electrolytic salt. Particularly useful salts include compositions of the alkali metal halides and/or the alkaline earth metal halides ordinarily incorporating a salt of the negative electrode reactant metal, e.g. lithium. In cells operating at moderate temperatures, aqueous and organic base electrolytes are permissible and these also can include cations of the negative electrode metal.

Alkali metals such as lithium, sodium, potassium or alkaline earth metals including calcium, magnesium, etc. and alloys of these materials are contemplated as negative electrode reactants. Alloys of these materials such as lithium-aluminum, lithium-silicon, lithium-magnesium, calcium-magnesium, calcium-aluminum, calcium-silicon and magnesium-aluminum have been investigated to maintain the negative electrode in solid form and thereby improve retention of the active material at high cell operating temperatures.

One of the disadvantages of previous lithium alloys, e.g. lithium-aluminum electrodes, has been the decline in cell capacity during prolonged operation. The reduced capacity has been accepted in order to obtain the enhanced electrode and cell stability afforded by solid lithium alloys. In lithium-aluminum negative electrodes, postoperative examinations of long-lived cells have revealed high lithium concentrations at the negative electrode face and agglomeration of Li-Al particles in the porous electrode.

The present inventor has found that the addition of a small amount of graphitized carbon or intermetallic $Al_5Fe_2$ or mixtures thereof to a lithium-aluminum electrode has the unexpected properties of significantly increasing the cell capacity and stability over multiple discharges and of significantly increasing the lithium-aluminum utilization.

SUMMARY OF THE INVENTION

It is an object of the present invention to provide a modified lithium-aluminum alloy for use in a negative electrode within a secondary electrochemical cell.

It is a further object to provide a modified lithium-aluminum alloy for use in a negative electrode which exhibits increased electrode utilization and stability as well as increased capacity with respect to electrodes containing only lithium-aluminum alloys.

It is another object to provide a modified lithium-aluminum alloy containing with a reduced propensity to agglomerate during discharge.

It is a further object to provide a lithium alloy material for a negative electrode having improved electrode capacity which does not diminish upon deep discharge cycling.

In accordance with the present invention, a negative electrode composition and secondary, high-temperature electrochemical cell are presented. The cell includes an electrolyte containing lithium ions and a positive electrode including chalcogens or transition metal chalcogenides. The negative electrode composition comprises lithium and aluminum and an additive of graphitized carbon or $Al_5Fe_2$ or combinations thereof. Preferably, the lithium content in the negative electrode is in the range of from about 5 to about 50 atom percent and the aluminum content is in the range of from about 95 to about 50 atom percent.

In a more specific aspect of the invention, the negative electrode comprises a particulate mixture of lithium-aluminum alloy and electrolyte and a material selected from graphitized carbon, an aluminum-iron alloy and mixtures thereof, the lithium-aluminum alloy being present in the range of from about 45 to about 80 percent by volume of the negative electrode, the electrolyte being present in an amount not less than about 10 percent by volume of the negative electrode, the graphitized carbon being present in the range of from about 1 to about 10 percent by volume of the negative electrode, the aluminum-iron alloy being present in the range of from about 3 to about 10 percent by volume of the negative electrode.

In another aspect of the invention the secondary electrochemical cell comprises a positive electrode and a negative electrode and an electrolyte, the positive electrode comprising an active material of a chalcogen or a transition metal chalcogen, the negative electrode comprising a particulate mixture of a lithium-aluminum alloy and electrolyte and a material selected from graphitized carbon, an aluminum-iron alloy and mixtures thereof, the lithium-aluminum alloy being present in the range of from about 45 to about 80 percent by volume of the negative electrode, the electrolyte being present in an amount not less than about 10 percent by volume of the negative electrode, the graphitized carbon being present in the range of from about 1 to about 10 percent by volume of the negative electrode, said aluminum-iron alloy being present in the range of from about 3 to about 10 percent by volume of the negative electrode.

Graphitized carbon is particulate carbon which is heated in a protective atmosphere to a temperature in the range of from about 1000° C. to about 2000° C. in order to initiate the change to graphite structure. "Graphitized carbon" as used in this application means carbon which has been heated within the aforesaid temperature range; however, higher heating temperatures are not excluded but are unnecessary. Graphitized carbon as used herein does not require that the carbon be entirely graphitic.

Where carbon is added to the negative electrode, it is preferred that the carbon be present in the range of from about 1 to about 10 volume percent of the negative electrode. If the graphitized carbon is present in less than about 1 percent by volume of the negative electrode, then there is no beneficial effect; however, if the graphitized carbon is present in an amount greater than about 10 percent by volume of the negative electrode then there is too much inert weight in the electrode which displaces the electrolyte, thereby decreasing the efficiency of the electrode and the cell. It is preferred that the graphitized carbon be present in the range of from about 3 to about 7 percent by volume of the negative electrode.

Where Raney iron ($Al_5Fe_2$) is used in place of the graphitized carbon, then it is preferred that the Raney iron be present in the range of from about 3 to about 10 percent by volume of the negative electrode. If the Raney iron is present in an amount less than about 3 percent by weight of the negative electrode, then there is insufficient additive to obtain the objects of the present invention whereas if the Raney iron is present in an amount greater than about 10 percent by volume of the negative electrode, then the Raney iron will displace too much electrolyte and the cell will diminish in efficiency due to the excessive inert material present.

Accordingly, it is preferred that the negative electrode contains a lithium-aluminum alloy present in the range of from about 45 to about 80 percent by volume of the negative electrode and an additive up to about 10 percent by volume of the negative electrode with the remainder being electrolyte. It can be seen that the electrolyte should never be less than about 10 percent by volume of the electrode. If the lithium-aluminum alloy is present in an amount less than about 45 percent by volume of the negative electrode, then a high energy cell is not obtained, whereas if the lithium-aluminum alloy is present in an amount greater than about 80 volume percent of the negative electrode, then there is insufficient room for an electrolyte and the additive. If there is less than about 10 percent by volume of the electrolyte in the negative electrode, then the electrode will be sluggish and will during operation of the electrochemical cell expand to obtain electrolyte, thereby disturbing the geometric configuration of the cell.

DESCRIPTION OF THE FIGURES

FIG. 2 is a schematic illustration of a special testing design for an electrochemical cell.

DETAILED DESCRIPTION OF THE INVENTION

Figure 1:
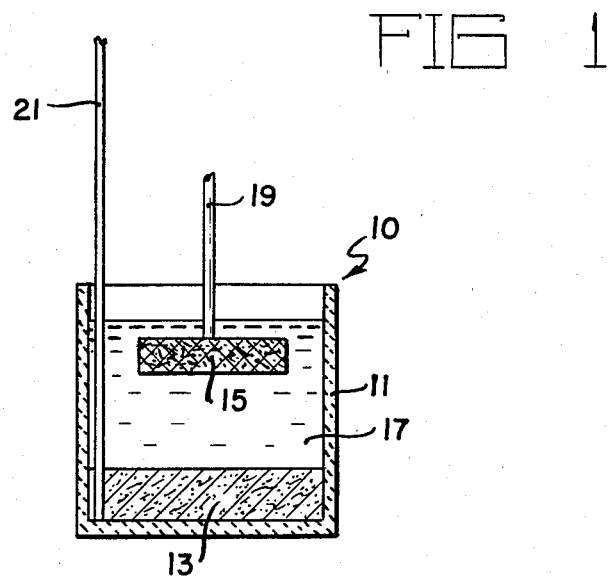
FIG. 1 is a schematic illustration of an electrochemical cell that can be used in testing the electrode composition of the invention.

The improved electrode composition and cell of the invention includes a lithium-aluminum alloy along with an additive in sufficient quantities to impart increased lithium alloy utilization and relatively stable and improved cell capacity during repeated deep discharge cycles.

The additives which may be used in the subject invention are from the class consisting of graphitized carbon, as previously defined, Raney iron or mixtures of graphitized carbon and Raney iron. Where the additive is graphitized carbon, it should be present in the range of from about 1 percent to about 10 percent by volume of the negative electrode and where the additive is Raney iron, the aluminum-iron intermetallic $Al_5Fe_2$, then it should be at least 3 to about 10 percent by volume of the negative electrode. Effective mixtures of graphitized carbon and Raney iron may be used in lieu of either the Raney iron or the graphitized carbon and the minimum amounts depend on the ratio of graphitized carbon to Raney iron, which is within the skill of the art.

Lithium in the range of about 5 to about 50 atom percent is added by direct contact or by electro-deposition into the aluminum to form the lithium-aluminum alloy. The lithium concentration is limited by its propensity to form molten phases with the alloy components at high temperatures and at high lithium concentrations. Fifty atom percent lithium is selected as a practical limit for cells operating in the 350° C. to 550° C. temperature range suitable for molten electrolytes. Higher lithium concentrations may be selected for cells capable of operating at lower temperatures such as with molten salt eutectics having low melting points or with aqueous or organic-based electrolytes containing lithium ions. The use of an additive selected from the class consisting of graphitized carbon, as hereinbefore defined, or Raney iron or mixtures thereof provide lithium alloy utilization of about 80 to 85 percent and stable capacity. Increased capacities of up to about 40 percent compared to lithium-aluminum negative electrode without the additive have been observed.

In the past, negative electrode materials were prepared by various metallurgical techniques such as that disclosed in my U.S. Pat. No. 4,158,720 issued June 19, 1979, assigned to the assignee of the present invention, the disclosure of which is incorporated herein by reference. In that patent, the negative electrode was prepared by forming a molten alloy of iron and aluminum. The melt was formed at a temperature above the melting point of aluminum but below the melting point of iron. For the alloys contemplated in that patent, temperatures of 1200° C. or above were satisfactory. The melt was solidified and comminuted to particles of aluminum-iron alloy in the specified proportions. Thereafter, the alloy particles were integrated into a porous, electrically conductive substrate. This was achieved by compacting the particles together with a powdered electrolyte by vibrating or otherwise distributing the particles into a porous electrically substrate or by bonding the particles with a combination, thermal setting material to form a porous electrically conducted substrate. Other metallurgical techniques such as casting or extruding are also discussed.

The preferred method of making the negative electrode of this invention involves forming a slurry of the lithium-aluminum particles in a carrier inert to lithium alloys such as dry petroleum ether, toluene, kerosene, or the like such that the resultant slurry is a spreadable and extrudable paste. The preferred amount of organic carrier is about 30 percent by volume; however, the carrier may be present in an amount up to 50 volume percent or be as low as 10 volume percent, depending on particle size and desired viscosity.

In the inert carrier is present in an amount greater than 50 volume percent, then the slurry becomes too runny and does not retain its shape upon extrusion and also the amount of heat required to drive off the solvent is greater and handling costs are greater. On the other hand, if less than about 10 percent by volume inert carrier is used to form the slurry, then the close packing and protective nature of the carrier is not obtained, and the method is not advantageous.

By selecting an inert carrier such as petroleum based liquids such as toluene, kerosene, mineral spirits and the like, several benefits are obtained. It has been found that in the slurry, a closer particle packing density is obtained when compared to dry powder packing, the method most commonly used to fabricate electrodes of the present type. Because the lithium-aluminum alloy particles are irregularly shaped and the carrier apparently provides some lubricating properties, the lithium-aluminum particles pack more densely than dry powder packing. Typically, lithium-aluminum dry packing results in 50 percent of theoretical density to give a loading density of about 0.7 amp-hours/cc which is marginal for producing high-specific-energy cells. The aforesaid inert hydrocarbon slurry technique enables a 0.9 amp-hour/cc loading density which is well suited for high-specific-energy cells. This technique gives loading densities about equal to the cold pressed lithium-aluminum electrode loading densities.

In addition to producing comparable electrode loading density to cold pressing, the slurry electrode fabrication technique provides considerable advantage in that the slurry technique is not limited to flat rectangularly shaped electrodes, as is cold pressing. When the slurry is extrudable it may be extruded to conform to advanced current collector design with irregularly shaped electrode terminals. This technqiue is not available when using cold pressing. For instance, cylindrical or annularly shaped electrodes can be formed by means of an extrudable slurry. In addition, the slurry technique accommodates active material which is very brittle, whereas cold pressing depends on material ductility to obtain the desired electrode loading density. Electrodes of greater than 48 atom percent lithium-aluminum cannot be made by cold pressing because the lithium alloy particles are too brittle. However, the slurry technique does not depend on material ductility to obtain the desired electrode shape and, in addition, does not develop stresses within the electrode of the type that have resulted in bowing and warping of cold pressed electrodes.

A still further benefit of the slurry technique is that room temperature extrusion is possible because the inert petroleum carrier provides sufficient protection to allow the extrusion to take place under normal atmosphere conditions as opposed to the protective atmosphere which is now required for the dry packing technique.

Referring now to FIG. 1 of the drawings, there is illustrated an electrochemical cell 10 that schematically illustrates a cell suitable for testing electrodes of the present type, the cell 10 being illustrated in my U.S. Pat. No. 4,011,374 issued Mar. 8, 1977 assigned to the assignee of this application, the disclosure of which is incorporated herein by reference. Although the cell 10 is schematic in nature, it will be understood that cells of this general type may be used in layered configuration or the like, all as well known in the art, the cell 10 includes a non-conductive exterior housing 11, a negative electrode 13 and a positive electrode 15 separated by molten electrolyte 17. Electrode conductors 19 and 21 respectively extend from the positive electrode 15 and the negative electrode 13. Although schematic in nature, it will be understood that one skilled in the art can make an electrochemical cell 10 of the same general type to incorporate multiple layers of negative and positive electrodes separated by molten electrolyte, all with suitable support members, insulators and other items well known in the art.

Referring now to FIG. 2 of the drawings, there is disclosed a special test cell 20 used to generate the data hereinafter reported. Because typical multiplate cells exhibit more electrode agglomeration for the inner negative electrodes, that is electrodes operated with electrolyte at both faces, the test cell 20 incorporates such a design. The test cell 20 is a positive grounded bicell with a center negative electrode 25 which may be cold pressed lithium-aluminum alloy (49 atom percent lithium and 70 amp-hour capacity) which is surrounded by a boron nitride separator 26. Perforated iron current collectors 27 and 28 are respectively at the outer bounderies of the negative electrode 25 and at the inner boundary of the iron sulfide positive electrode 30. The perforated sheet current collectors 27, 28 have apertures about 38 mils in diameter with 45 percent of each sheet being open area. The test cell 20 is designed with twice the positive electrode 30 capacity compared to the negative electrode 25 capacity, whereby the test cell 20 capacity is controlled by the negative electrode 25. The negative electrode 25 is heavily polarized, particularly at the end of discharge, all of these conditions being contrary to stable cell capacity in previous investigations.

A test cell 20 hereinafter identified as WR-3 was constructed according to the slurry method hereinbefore described using a negative electrode of 49 atom percent lithium in the lithium-aluminum alloy, the alloy being present in an amount equal to 87 percent by volume of the negative electrode, excluding the perforated iron sheet current collector. Also included in the electrode was 3 volume percent graphitized carbon powder. The graphitized carbon powder used preferably has a particle size in the range of from about +325 to about −200 U.S. Mesh Series, and if Raney iron ($Al_5Fe_2$) is used as an additive, then the Raney iron should preferably have a particle size of from about +325 to about −100 U.S. Mesh Series.

Figure 3:
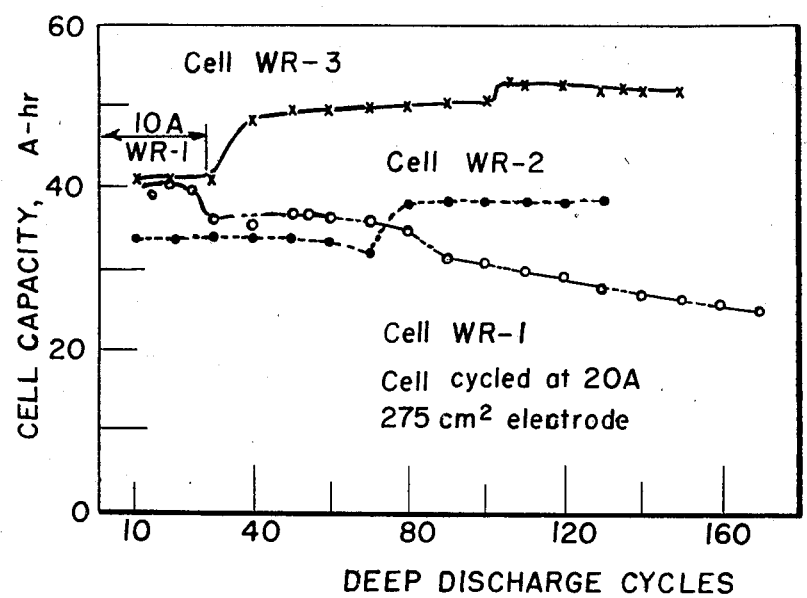
FIG. 3 is a graph showing the relationship between cell capacity in amp-hours and lithium alloy utilization with respect to deep discharge cycles for several negative electrodes.

Using a test cell as disclosed in FIG. 2 and a negative electrode having a 92.3 weight percent lithium-aluminum alloy and 7.7 weight percent graphitized carbon, the WR-3 negative electrode was constructed. This electrode had 65 amp-hours of lithium alloy capacity vs 120 amp-hours of iron sulfide capacity in the positive electrode, whereby the lithium alloy electrode was the limiting factor of the cell couple. As illustrated in FIG. 3, the lithium-aluminum electrode with the graphitized carbon additive exhibited about 40 percent increased capacity compared to the WR-1 cell formulated with a lithium-aluminum negative electrode having no additive material. The WR-2 cell had a negative electrode of lithium-aluminum with a 5 volume percent Raney iron ($Al_5Fe_2$) additive and although the WR-2 cell did not have as significantly improved capacity as the WR-3 cell, the WR-2 cell capacity was significantly improved over the WR-1 cell both in its lithium alloy utilization and its nondeclining cell capacity during deep discharge cycle. Even after 550 cycles the WR-2 cell with the Raney iron additive had better than 98+ percent coulombic efficiency and with about 0.027 percent capacity decline rate.

Examination of the WR-3 cell after 186 cycles determined it had a 99 percent coulombic efficiency. Although some areas of agglomeration was seen at the electrode center, the graphitized carbon powder tended to break up the densified area, and further, each carbon particle retained an electrolyte film, whereby these areas were electrochemically active. Examination of the WR-3 cell found no lithium-aluminum carbon phase in the cell, whereby it is assumed that the carbon remains discrete. Not only did the WR-3 cell have a 40 percent improved capacity with respect to the WR-1 cell, but the capacity of the WR-3 cell did not decline during deep discharge cycles and unexpectedly increased at the freeze-thaw cycle.

The present negative electrode 25 is a significant improvement with respect to negative electrodes incorporating various resins as binders since the chemicals in resin binders tend to react with the lithium-aluminum at elevated temperatures to diminish the electrochemical capacity of the negative electrode. Typically, the binder resins evolve water, hydrogen, oxygen, nitrogen, methane and other components during pyrolysis which react with the lithium in the negative electrode forming the oxides, the hydroxides and the nitrides to reduce the lithium capacity, all of which is deleterious to cell performance.

It is apparent that a major problem in the development of the lithium-aluminum/iron sulfide cell has been solved by the subject invention. In the past, the lithium-aluminum/iron sulfide cells had a marked decline in capacity during deep discharge cycling. Previously it had been found that by limiting the lithium-aluminum electrode capacity to less than about 65 percent of theoretical capacity, the stable cell-capacity relationship could be achieved. However, with the lithium-aluminum alloy having the additive of the present invention formulated into a negative electrode, utilizations of about 82 percent have been achieved without declining during deep discharge cycling. It is believed that the disclosed additives suppress the agglomeration processes which degrades conventional lithium-aluminum electrodes during deep discharge cycling.

It can be seen from the foregoing, that the present invention provides an improved negative electrode structure for use in electrochemical cells. The additive material in the negative electrode is such that it maintains stable electrode capacity during deep discharge cycles and provides vastly improved electrode utilization.

While there has been disclosed what at present is considered to be the preferred ebodiment of the present invention, it will understood that various modifications and alterations may be made therein without departing from the true spirit and scope of the present invention, and it is intended to cover within the claims appended hereto all such alterations, variations and modifications.

The embodiments of the invention in which an exclusive property or privilege is claimed are defined as follows:

1. A negative electrode comprising a particulate mixture of lithium-aluminum alloy and electrolyte and a material selected from graphitized carbon, an aluminum-iron alloy or mixtures thereof, said lithium-aluminum alloy being present in the range of from about 45 to about 80 percent by volume of the negative electrode, said electrolyte being present in an amount not less than about 10 percent by volume of the negative electrode, said graphitized carbon being present in the range of from about 1 to about 10 percent by volume of the negative electrode, said aluminum-iron alloy being present in the range of from about 3 to about 10 percent by volume of the negative electrode.

2. The negative electrode of claim 1, wherein said lithium-aluminum alloy contains lithium in the range of from about 5 to about 50 atom percent and aluminum in the range of from about 95 to about 50 atom percent.

3. The negative electrode of claim 1, wherein said lithium-aluminum alloy is present in an amount not less than about 49 percent by volume of the negative electrode.

4. The negative electrode of claim 1, wherein said electrolyte is a salt containing lithium halide.

5. The negative electrode of claim 1, wherein said electrolyte is the eutectic mixture of lithium chloride and potassium chloride.

6. The negative electrode of claim 1, wherein said graphitized carbon is present in the range of from about 3 to about 7 percent by volume.

7. The negative electrode of claim 1, wherein graphitized carbon is produced by heating carbon powder to a temperature in the range of from about 1000° C. to about 2000° C.

8. The negative electrode of claim 1, wherein said graphitized carbon in the particulate mixture has a particle size in the range of from about +325 to about −200 U.S. Mesh Series.

9. The negative electrode of claim 1, wherein said aluminum-iron alloy is the intermetallic phase $Al_5Fe_2$.

10. The negative electrode of claim 9, wherein said $Al_5Fe_2$ in the particulate mixture has a particle size in the range of from about +325 to about −100 U.S. Mesh Series.

11. A secondary electrochemical cell comprising a positive electrode and a negative electrode and an electrolyte, said positive electrode comprising an active material of a chalcogen or a transition metal chalcogen, said negative electrode comprising a particulate mixture of lithium-aluminum alloy and electrolyte and a material selected from graphitized carbon, an aluminum-iron alloy or mixtures thereof, said lithium-aluminum alloy being present in the range of from about 45 to about 80 percent by volume of the negative electrode, said electrolyte being present in an amount not less than about 10 percent by volume of the negative electrode, said graphitized carbon being present in the range of from about 1 to about 10 percent by volume of the negative electrode, said aluminum-iron alloy being present in the range of from about 3 to about 10 percent by volume of the negative electrode, said electrolyte containing lithium ions providing ionic communication between said positive and negative electrodes.

12. The secondary electrochemical cell of claim 11, wherein the active material in said positive electrode is an iron sulfide.

13. The secondary electrochemical cell of claim 11, wherein said lithium-aluminum alloy contains lithium in the range of from about 5 to about 50 atom percent and aluminum in the range of from about 95 to about 50 atom percent.

14. The secondary electrochemical cell of claim 11, wherein said lithium-aluminum alloy is present in an amount not less than about 49 percent by volume of the negative electrode.

15. The secondary electrochemical cell of claim 11, wherein said electrolyte is the eutectic mixture of lithium chloride and potassium chloride.

16. The secondary electrochemical cell of claim 11, wherein said graphitized carbon is present in the range of from about 3 to about 7 percent by volume.

17. The secondary electrochemical cell of claim 11, wherein graphitized carbon is produced by heating carbon powder to a temperature in the range of from about 1000° C. to about 2000° C.

18. The secondary electrochemical cell of claim 11, wherein said graphitized carbon in the particulate mixture has a particle size in the range of from about +325 to about −200 U.S. Mesh Series.

19. The secondary electrochemical cell of claim 11, wherein said aluminum-iron alloy is the intermetallic phase $Al_5Fe_2$.

20. The secondary electrochemical cell of claim 11, wherein said $Al_5Fe_2$ in the particulate mixture has a particle size in the range of from about +325 to about −100 U.S. Mesh Series.

* * * * *